COMBINATION RADIO RECEIVER AND HEARING AID

Filed Nov. 1, 1946 2 SHEETS—SHEET 1

INVENTOR
LEMUEL M. TEMPLE
BY Elmer J. Gorn
ATTORNEY

COMBINATION RADIO RECEIVER AND HEARING AID

Filed Nov. 1, 1946 2 SHEETS—SHEET 2

INVENTOR
LEMUEL M. TEMPLE
BY Elmer J. Gorn
ATTORNEY

Patented Nov. 18, 1952 2,618,707

UNITED STATES PATENT OFFICE 2,618,707

COMBINATION RADIO RECEIVER AND HEARING AID

Lemuel M. Temple, Scarsdale, N. Y., assignor to Raytheon Manufacturing Company, Newton, Mass., a corporation of Delaware Application November 1, 1946, Serial No. 707,231

1 Claim. (Cl. 179—2)

This invention relates to a combination miniature radio receiver and hearing aid.

It is a main object of the present invention to provide a device of the type described which will enable a person with impaired hearing to use said device, either as a hearing aid or a radio receiver.

The above and other objects of the present invention, which will become more apparent as the detailed description thereof progresses, are attained, preferably, in the following manner.

While not limited thereto, the present invention is admirably adapted to operate in conjunction with the radio receiver disclosed in the copending application of Lemuel M. Temple, entitled "Radio Tuning Device," Ser. No. 682,505, filed July 10, 1946, now Patent No. 2,496,424, dated February 4, 1950, which comprises, for example, a complete vest pocket radio receiver enclosed within a substantially shallow frame, the entire assembly being covered by a dust proof cover and having means, exteriorly of said cover, for manually tuning said receiver. In one embodiment of the device of the present invention, said invention will be used in connection with the above-described radio receiver, wherein the manipulation of the manually-operated tuning means of said receiver provides the necessary impetus to means for bringing about a change-over from radio receiving to hearing aid.

In the accompanying specification there shall be described, and in the annexed drawings shown, an illustrative embodiment of the means for operating the device of the present invention. It is, however, to be clearly understood that the invention is not to be limited to the details herein shown and described for purposes of illustration only, inasmuch as changes therein may be made without the exercise of invention, and within the true spirit and scope of the claim hereto appended.

Reference is therefore had to the attached drawings, in which.

Figures 1, 3:
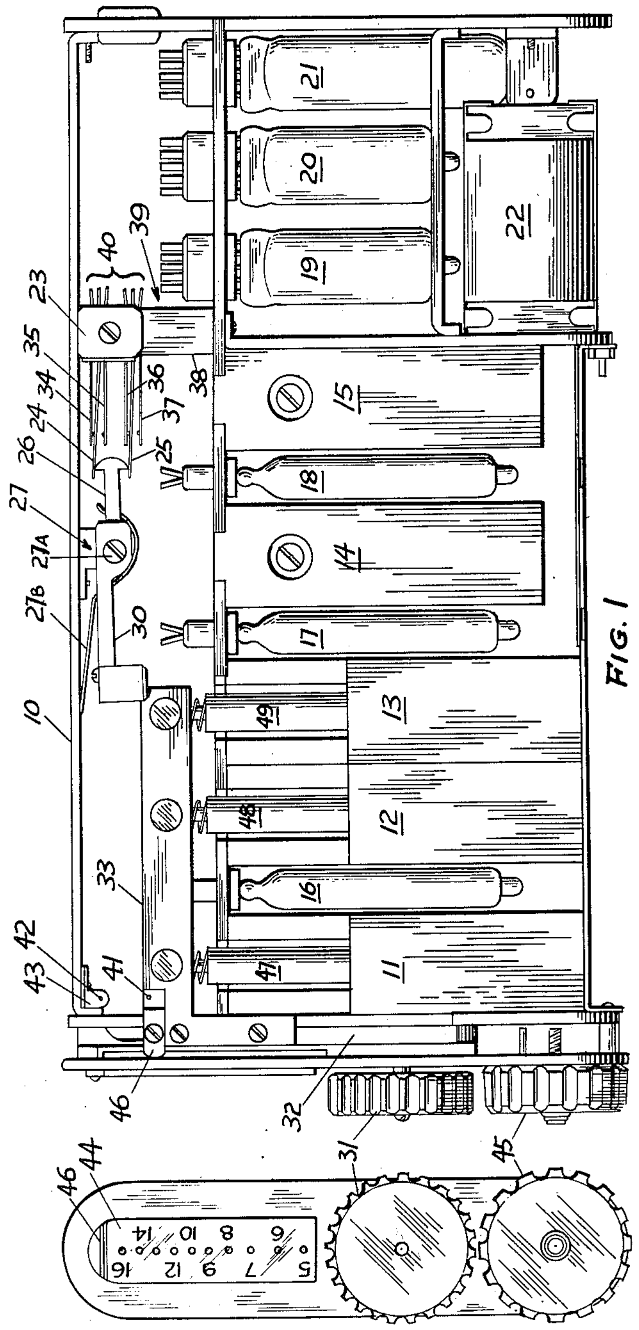
Fig. 1 is a plan view of the device when used in conjunction with a vest pocket radio receiver of the type referred to in connection with the aforementioned copending application.
Figure 3 illustrates the dial and manual tuning control of the device depicted in Figs. 1 and 2.
Figure 2:
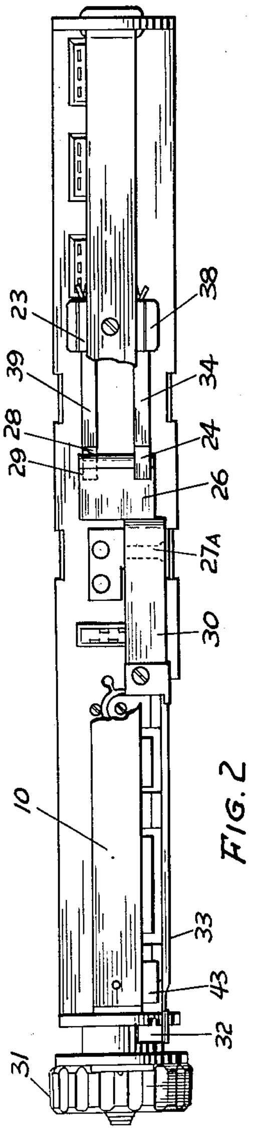
Fig. 2 represents a view of one edge of the device as illustrated in Fig. 1.

Referring now more particularly to Figs. 1, 2 and 3, the numeral 10 indicates a substantially rectangular frame within which are enclosed all of the components, pertaining to the radio receiver and hearing aid.

With particular reference to the radio frequency receiving section of the present device, said section includes the usual stages, such as a radio frequency amplifier stage, a frequency converter, and an intermediate frequency amplifier stage, said radio-frequency portion having a shielded antenna coil 11, a radio-frequency coil 12, oscillator coil 13, and two intermediate frequency coils 14 and 15. Amplification for the aforesaid stages is provided by a plurality of electron discharge tubes, of which tube 16 is a radio frequency amplifier, tube 17, a frequency converter, and tube 18, an intermediate frequency amplifier.

In the audio frequency section there is provided a plurality of radio tubes 19, 20 and 21 whose respective functions are as follows. Tube 19 performs, as will be presently explained, a dual role, the first as a second half-wave diode detector and the second as a voltage amplifier in a cascade voltage amplifying stage in conjunction with tube 20. When tube 19 functions as a second detector, etc., only the filament 58 (Fig. 4) and control grid 65 (Fig. 4) are operative. The tube 20 operates in conjunction with the tube 19, in its first role, as a first audio-frequency amplifier and the tube 21 operates as a power output amplifier. The output of the tube 21 is coupled to a reproducer 69 through the medium of an audio-frequency transformer 22.

Incorporated in the device and attached to frame 10 is, for example, a four-contact-arm double-throw toggle switch 23. In Fig. 1 only two of said contact arms 24 and 25 are visible. Between said contact arms is disposed the shorter arm 26 of a lever 27. Said lever may be composed of insulating material, for example, Bakelite. The other two contact arms are in juxtaposition with respect to the contact arms 24 and 25. The third and fourth of said contact arms 28 and 29 are shown in Fig. 2, contact arm 29 being shown in dotted outline. The aforementioned lever is pivotally supported on the frame 10 by a fulcrum pin 27A. A spring member 27B holds the lever 27, normally, in a position such that the switch 23 maintains the radio receiver in operation.

Opposite the arm 26, and being an extension thereof, is a longer arm 30. When it is desired to change the operation from radio receiving to hearing aid, a knob 31, positioned exteriorly of said frame 10, is manipulated so as to cause a tuning drive 32 to actuate an L-shaped member 33 supported thereby. This tuning drive comprises a rack and pinion, the details of which are more completely described in the aforementioned copending application. As said L-shaped member is caused to move into contact with the longer arm 30 of said lever 27, it causes the shorter arm 26 to actuate the contact arms 24, 25, 28 and 29.

Figure 4:
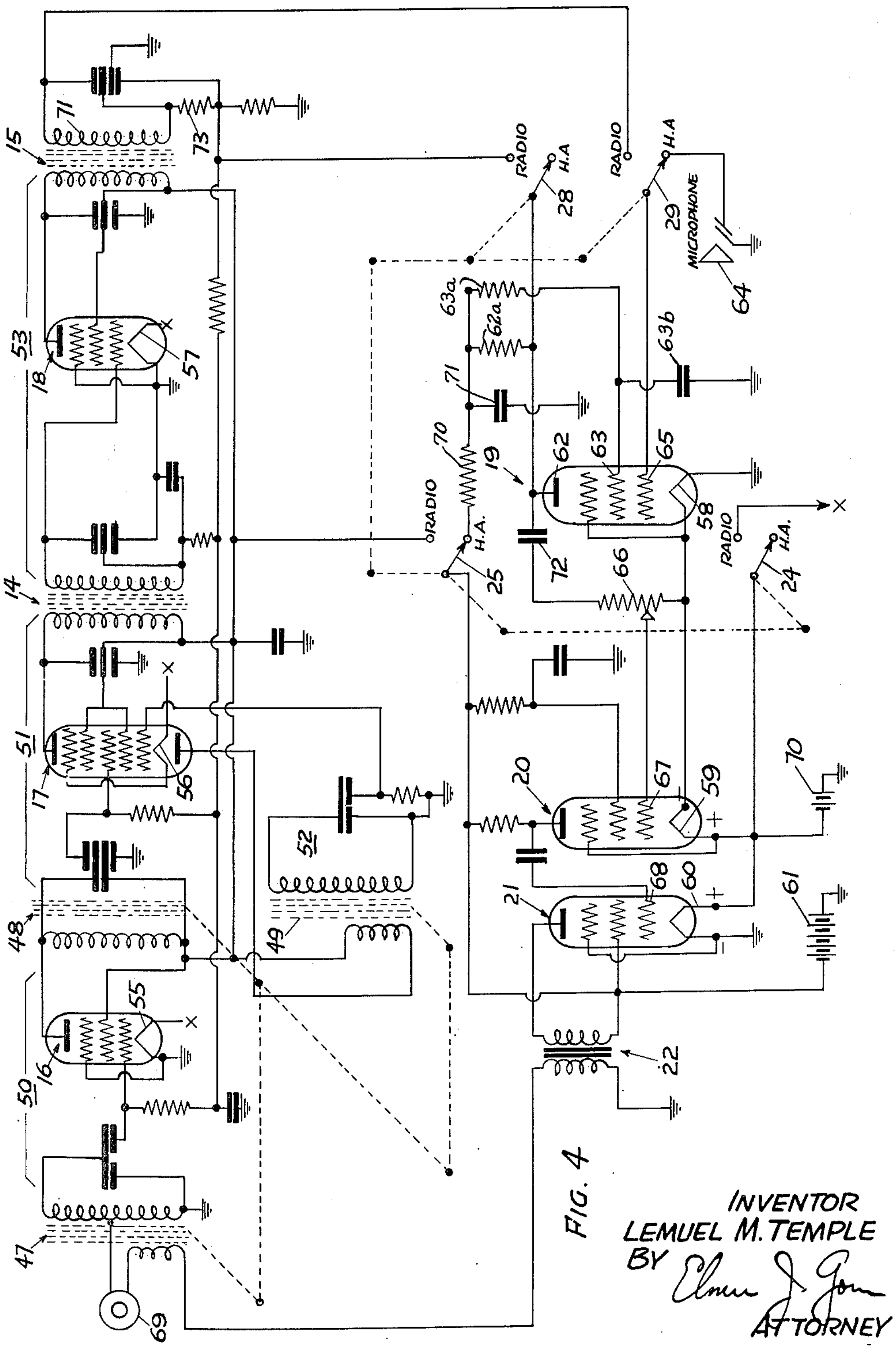
Fig. 4 is a schematic drawing showing the electrical connections of the device of the present invention.

Disposed on either side of the contact arms 24, 25, 28 and 29 are a plurality of contacts 34, 35, 36, 37 and their counterparts. However, in Fig. 2 the numeral 39 indicates one of said counterpart contacts. All of the aforesaid contact arms and contacts are supported by an insulating member 38, and extend through and emerge from the side 39 of said insulating member to form a plurality of electrical connecting terminals 40. The manner in which the aforesaid terminals are connected is illustrated in Fig. 4. When said contact arms 24, 25, 28 and 29 are actuated by the L-shaped member 33, the operation of the device changes from radio receiving to hearing aid operation.

Digressing for the moment, and referring back to the L-shaped member 33, attention is called to an aperture 41 provided therein for engagement with an indent 42 provided on an angularly-bent member 43, said last-named member being attached to the frame 10. When the aperture engages said indent, it holds, in the hearing aid operating position, the L-shaped member which might otherwise be urged out of said position due to the tension of the spring member 27B. The member 43 may be made of Phosphor bronze, for example, and should have sufficient tension to overcome the tension exerted by spring member 27B. However, the tension of said member 43 should be such that it will not interfere with the operation of the tuning drive 32.

Fig. 3 illustrates a view of the dial 44, used in connection with the selection of any desired frequency of the radio receiver section of the present device, along with the tuning knob 31 and a knob 45 for controlling the volume of said device. As indicated in Fig. 3, a pointer 46 is shown in a position, which, in this particular view, is beyond the maximum frequency of said radio receiver as indicated on the dial 44. When the pointer is in the above-mentioned position, it indicates, to the user of the device, that it is operating as a hearing aid, said pointer coinciding with the position of the L-shaped member 33 to which it is attached.

It will be observed that all of the electrical connections have been omitted from Figs. 1, 2 and 3 of the drawing. This was done to enable a more simple presentation of the main features of the present invention, the actual electrical connections being described in connection with Fig. 4.

Referring now to Fig. 4, wherein is schematically diagrammed the electrical connections of the device of the present invention, the radio frequency section of said circuit is that of a conventional superheterodyne receiver. Tuning of the various stages 50, 51 and the oscillator stage 52 is accomplished through ganged permeability tuning cores 47, 48 and 49. Said tuning cores are manipulated by the tuning drive 32 through the medium of the L-shaped member 33 to which said cores are attached. Following the intermediate frequency stage 53 are the radio tubes 19, 20 and 21, the functions of which were generally described in an earlier paragraph.

It will be the purpose of the following description to explain the novel circuit arrangement which imparts to the tubes 19 and 20 the dual role hereinbefore mentioned. Let it be assumed that the switch 23, which has four ganged contact arms 24, 25, 28 and 29, is in the hearing aid operating position labeled H. A. In this position contact arm 24 disconnects the filament supply source 70 which serves to energize a plurality of filaments 55, 56 and 57 of the electron discharge tubes 16, 17 and 18. However, with the contact arm 24 in this position, a plurality of filaments 58, 59 and 60 of the tubes 19, 20 and 21 remain energized. Contact arm 25 disconnects a power supply 61, for example, a battery, from the radio frequency and intermediate frequency stages 50, 51, 52 and 53. Contact arm 25 shifts said power supply from said last-named stages to feed power from said supply through a filter comprising a series resistance 70 and a shunt condenser 71 and a plate load resistor 62*a* to the anode 62 of tube 19. Power is also fed from the filter circuit comprising resistor 70 and condenser 71 through a voltage dropping resistor 63*a* to the screen grid 63 of tube 19, said screen grid being connected to ground through an alternating current by-pass condenser 63*b*. In said hearing aid operating position, contact arm 28 breaks the continuity of the second detector circuit in connection with the tube 19. Thus far, the aforementioned contact arms 24, 25 and 28 have served to disconnect, electrically, the entire radio frequency portion of the device. Contact arm 29, in addition to disconnecting the radio frequency stages from grid 65 of tube 19, connects microphone 64 to a grid 65 of the tube 19.

With the aforesaid switches in the hearing aid operating position, speech impinging on said microphone 64 is conducted through contact arm 29 to the control grid 65 of the tube 19. Any voltage generated by the microphone is amplified by said tube 19, the output of which appears across plate load resistor 62*a* and is, in turn, applied through a coupling condenser 72 to one end of a variable tapped resistor 66, the other end of which is returned to ground through the filament 58 of tube 19. The variable tap of resistor 66 is connected to a control grid 67 of the tube 20. With the switch in the aforesaid position the tubes 19 and 20 function as conventional resistance coupled audio amplifiers, the output of tube 20 being applied, in the usual manner, to a control grid 68 of the power output amplifier tube 21. The amplified audio-frequency output of the tube 21, in turn, is applied to an earphone 69 through the audio-frequency transformer 22. The cord connecting transformer 22 to the earphone 69 acts as an antenna and hence is connected to the R. F. input coil 47 of the radio receiver. Since the R. F. input coil is tuned by a shunt condenser to a frequency of a few megacycles, audio-frequencies will not be fed into the R. F. stages of the receiver. The earphone may be, for example, either a compression or bone-conduction type reproducer.

With the multiple contact arm switch 23 in the radio receiving position, the contact arm 24 reconnects the filament supply 70, for example, a battery, to the filaments 55, 56 and 57 and the contact arm 25 shifts the power supply 61 to the radio frequency stages 50, 51, 53 and the oscillator stage 52 from the anode 62 and the screen grid 63 of the tube 19. Now the tube 19 operates as a diode instead of a pentode and in this role functions as a half-wave diode detector Contact arms 29 and 28 complete the detector circuit by connecting, respectively, the grid 65, acting as a diode anode, to one end of the secondary 71 of the intermediate-frequency transformer 15 and the cathode or filament 58 of said tube 19, through the volume control potentiometer 66, a capacitor 72, thence through a resistance 73 to the other end of said secondary 71, said resistance being part of a radio-frequency filtering network. The operation of the device is now that of a superheterodyne radio receiver employing a separate half-wave diode detector, tube 19 and a separate first audio amplifier, tube 20.

Although not illustrated or described in connection with the present specification, suitable means for connecting the power supplies to the earphone and microphone will readily become apparent to those skilled in the art of manufacturing such devices.

While the present invention was described in connection with its use in a superheterodyne circuit, is is readily adaptable to other types of radio receiving circuits, portable or otherwise. Therefore, other objects and advantages of the present invention will readily occur to those skilled in the art to which the same relates.

What is claimed is:

An electron-discharge system operable as a radio receiver or a hearing aid, an electron-discharge tube common to both said receiver and said hearing aid, said electron-discharge tube having at least a cathode, a grid, and an anode, a power supply, means for operating said electron-discharge tube as an audio-frequency amplifier comprising means for connecting said anode to said power supply, means for operating said electron-discharge tube as a detector comprising means for disconnecting said anode from said power supply, said disconnecting means comprising a switch, means for actuating said switch by the tuning mechanism of said receiver, said tuning mechanism comprising a slidable rack engageable with said switch, and a rotatable pinion engaging said rack for imparting linear motion thereto.

LEMUEL M. TEMPLE.

REFERENCES CITED

The following references are of record in the file of this patent:

UNITED STATES PATENTS

| Number | Name | Date |
|---|---|---|
| 1,694,654 | Hammond | Dec. 11, 1928 |
| 1,756,815 | Cotter | Apr. 29, 1930 |
| 1,822,653 | Grebe | Sept. 8, 1931 |
| 1,892,704 | MacAlpine | Jan. 3, 1933 |
| 1,897,557 | Graham | Feb. 14, 1933 |
| 1,915,645 | Carter | June 27, 1933 |
| 1,964,502 | Cornell | June 26, 1934 |
| 2,064,990 | Roberts | Dec. 22, 1936 |
| 2,072,953 | Kelly | Mar. 9, 1937 |
| 2,097,765 | Klotz | Nov. 2, 1937 |
| 2,115,756 | Whitman et al. | May 3, 1938 |
| 2,159,632 | Morey | May 23, 1939 |
| 2,255,680 | Sands | Sept. 9, 1941 |
| 2,259,250 | Jacob | Oct. 14, 1941 |
| 2,310,896 | Gustafson | Feb. 9, 1943 |
| 2,320,483 | Stocker | June 1, 1943 |
| 2,338,134 | Sands | Jan. 4, 1944 |
| 2,389,986 | Koch | Nov. 27, 1945 |
| 2,408.644 | Huff | Oct. 1, 1946 |
| 2,409,481 | Fordham | Oct. 15, 1946 |
| 2,455,191 | Richards | Nov. 30, 1948 |

FOREIGN PATENTS

| Number | Country | Date |
|---|---|---|
| 107,903 | Australia | July 20, 1939 |
| 493,878 | Germany | Mar. 17, 1920 |
| 517,555 | Great Britain | Feb. 1, 1946 |

OTHER REFERENCES

Stott: Abstract of application, Serial No. 624,290, pub. July 14, 1949, 624 O. G. 927.